(12) United States Patent
Cyman et al.

(10) Patent No.: US 6,236,463 B1
(45) Date of Patent: May 22, 2001

(54) GENERATING HIGH SPEED VARIABLE INFORMATION PRINTED MULTIPLE PAGE DOCUMENTS

(75) Inventors: Theodore F. Cyman, Grand Island; Kim K. Weller, Angola; Robert J. Recchione, Niagara Falls; Frank J. Mariani, Grand Island; Charles W. Proefrock, North Tonawanda; Thomas P. Kolniak, Grand Island, all of NY (US)

(73) Assignee: Moore U.S.A., Inc., Grand Island, NY (US)

( * ) Notice: Subject to any disclaimer, the term of this patent is extended or adjusted under 35 U.S.C. 154(b) by 0 days.

(21) Appl. No.: 09/006,385

(22) Filed: Jan. 13, 1998

Related U.S. Application Data

(60) Provisional application No. 60/035,700, filed on Jan. 17, 1997.

(51) Int. Cl.$^7$ ................................................ G06K 15/00
(52) U.S. Cl. ......................... 358/1.14; 358/1.1; 358/1.5; 358/1.17
(58) Field of Search ................................. 395/101, 105, 395/109, 114, 117; 358/1.1, 1.5, 1.9, 1.14, 1.17

(56) References Cited

U.S. PATENT DOCUMENTS 6,046,820 * 4/2000 Konishi ................................. 358/1.9

FOREIGN PATENT DOCUMENTS

| 0 459 793 | 12/1991 | (EP) | G06K/19/08 |
|---|---|---|---|
| 470 782 A2 | * 2/1992 | (EP) | G06K/15/00 |
| 0 470 782 | 2/1992 | (EP) | G06K/15/00 |
| 0 738 987 | 10/1996 | (EP) | G06K/17/00 |
| 96/19352 | * 6/1996 | (WO) | B41F/17/02 |

* cited by examiner

Primary Examiner—Mark Zimmerman
Assistant Examiner—Lance W. Sealy
(74) Attorney, Agent, or Firm—Nixon & Vanderhye PC

(57) ABSTRACT

A system and method are provided which have the ability to print whole documents at a time, rather than page by page. The data for an entire multi-page document is fed directly to an output device, and then a print engine. The data stream includes a record layout including data field codes which tell the data system and/or raster image processor where to print strings of variable information in a document so that the strings only need be provided once even if printed in multiple places within the document. Data flows in the data stream to the print engine as the raster image processor functions in real time. The system has the capability to manipulate and transfer data at 10 Mbytes per second, which translate into a transfer rate of approximately 92,000 characters per second at up to 1,000 feet per minute print speeds, for up to six controllers. Either fixed or variable graphic elements may also be transferred in this same manner as the data and processed by the RIP in real time and printed at the same speed as the data.

19 Claims, 6 Drawing Sheets

GENERATING HIGH SPEED VARIABLE INFORMATION PRINTED MULTIPLE PAGE DOCUMENTS

CROSS-REFERENCE TO RELATED APPLICATION

This is based upon provisional application Ser. No. 60/035,700 filed Jan. 17, 1997.

BACKGROUND AND SUMMARY OF THE INVENTION

The Moore XL Data System comprises electronics and software available from Moore Business Forms, Inc. of Lake Forest, Ill., which pre-processes job information prior to imaging of individual documents. The processing includes the preloading of images, the reading of variable data, web synchronization, and other functions. The XL Data System is useful with a wide variety of print engines, such as a MIDAX printer available from Moore Business Forms, Inc., a Xeikon printer, and other high speed printers using either electrostatic, ink jet or other conventional imaging technologies. A conventional XL Data System, as well as various improvements thereof such as shown in U.S. applications Ser. Nos. 08/709,848 filed Sep. 10, 1996 and 08/500,011 filed Jul. 10, 1995 (the disclosures of which are hereby incorporated by reference herein) are extremely effective. However, they, like other conventional control systems, typically are capable of operating so that printers print at a maximum speed of about 300 feet per minute, but certainly not more than about 500 feet per minute. The XL Data System, and other conventional systems, also have limitations in the speed of printing graphics, available colors, there are limitations on how much variable information can be provided at particular speeds.

According to the present invention a next generation of control system (to replace the XL Data System) is provided which greatly enhances functionality and capabilities. The system and method according to the present invention are capable of effecting printing of whole documents at a time, rather than page by page (necessary in known prior art systems). In conventional systems, including the XL Data System, each page has to be printed separately, and formatted separately, which restricted the speed of the process. That is all the information to be printed had to be formatted before hand to include variable and fixed information. Each formatted page was then sent through a raster image processor (RIP) and then on to a print engine where it was printed as a page. That is each page of the document had to be formatted separately.

According to the present invention a system and method are provided to effect a whole document, rather than page by page, printing by providing a data stream with a record layout. The record layout includes "tags" or data field codes while the data stream contains the information to be printed. These two sets of information are sent to the printer in parallel. The strings of information need only be provided once even if they are to be printed in several places within the document. The data field codes determine where in the document the strings will be printed, and the RIP operation is done in real time as the data flows to the printer.

The printer contains a page layout which has the data fields to be printed "tagged" with codes. When the data system tells the printer to print a particular area of a page of a document it sees the "tag" (data field code) in the page layout which corresponds to the "tag" in the record layout, and prints the data that is designated by that tag or data field code.

The data field code or "tag" is a code that designates a group of bytes in the data stream. For example the data field code—Name—will tell the page layout in the printer that characters X to Y (e.g. 10 to 33) of a data record are to be printed in the data field with the data field code—Name—.

In the control system according to the present invention, there is provided an independent, multiple input, self-contained registration controller. The registration controller relieves the RIPs of all registration functions. The RIPs are constructed to print not only from a top of form signal but along with a communications block from the data system through the registration controller. The communications block will tell the RIP which form number, within the RIP's data buffer to print at the next TOF. This allows the data system to request the RIP to print any form that has been transferred to the RIP. After the RIP has printed the requested form, the RIP will send a communication block back to the data system through the registration controller indicating that the form requested indeed has been printed.

At least one smart junction box will typically be used with the registration controller to condition sense mark, encoder, bar code, or like signals to be fed to the registration controller. "Conditioning" means that the signals are stabilized and transformed to the proper voltage and duration pulse that can be used by the registration controller to determine when to signal the start of printing. The registration controller has one or more network hubs (distribution points), with up to eight junction boxes connected to it. The registration controller hubs can also be connected together. This allows the system to be programmed so that any of the junction boxes can be used for the system master, and also means that any one junction box can be used to register any number of print engines.

The registration controller will communicate with a data system for providing a data stream, which a high speed serial link, such as a 100 based Ethernet link, or an RS 232, RS 422, RS 485, or the like, depending upon the speed required for any particular situation. The data system will use this link to send form lag, form size, and print request blocks to the registration controller, and it will also receive printed form verification back from the RIPs.

Typically the registration controller will have a remote terminal (preferably PC based) connected to it by a high speed serial link which will be used for a user interface to program the registration controller, and can double as a remote operator control box. The registration controller will also provide simple press functions such as MICR, TOF, and batch counting.

The registration controller hub will automatically keep track of multiple web form lag commands. To maintain form lag the registration controller constantly monitors each print engine's TOF in relationship with each master heartbeat. For example for every master heartbeat a TOF should occur. When that TOF occurs, a print current form number is sent out to the RIP. If no TOF occurs until the next system heartbeat, the print request sent to the RIP will have a −1 added to it. If two TOFs occur during a system heartbeat the second TOF will be tagged with a +1 to the form number. Once a form has been printed by the RIP, that RIP will communicate with the data system, through the registration controller, that it indeed has printed the specific form number. Utilizing the system and method according to the invention the actual print speed of the print engines (assuming that they are capable of such a print speed), and that appropriate paper transport mechanisms are provided to support that speed) may print at speeds of greater than 500 feet per minute, e.g. over 600 feet per minute, in fact over 800 feet per minute, and up to about 1,000 feet per minute. The system according to the invention has the capability to manipulate and transfer data (throughput) at ten Mbytes per second. This translates into a transfer rate of approximately 92,000 characters per second at up to 1,000 feet per minute to up to six controllers, or 360,000 characters per second at up to 300 feet per minute to up to six controllers.

According to the method and system of the present invention, graphic elements can be printed at the same speed as data. Graphic elements can be either variable or fixed and, since they are transferred in the same manner as data and processed by the RIP "on the fly" (in real time), they can be printed at the same speed as the data. Any of the graphic elements can be printed in any color, with up to 256 gray levels per color.

According to one aspect of the present invention a system for generating high speed variable information printed multiple page documents is provided. The system comprises the following components: A data system for providing a data stream. A registration controller connected to the data system through a high speed serial link, the registration controller providing all registration functions for printing documents. A print engine. A raster image processor connected to the registration controller, and connected to the print engine for controlling the print engine to print documents. A remote terminal (e.g. PC) connected to the registration controller to provide a user interface to the registration controller and a remote operator control. And, a smart junction box connected to the registration controller for bringing in and conditioning one or more of encoder, sense mark, bar code, or other signals and transmitting them to the registration controller.

The data system has the capability to manipulate and transfer data in the data stream at at least eight Mbytes per second (e.g. up to about ten Mbytes per second). The data includes, transmitted in parallel, a record layout including data field codes, and the print engine has associated therewith a page layout with data fields to be printed tagged with codes. This means that the data field codes tell the data system, the raster image processor, and/or the print engine where to print strings of information in a document, the strings only being provided once even if printed in multiple places within a document. Data flows in the data stream to the print engine as the raster image processor functions in real time. Preferably a plurality of raster image processors are provided connected to the registration controller, each raster image processor capable of printing a response to either the data stream or a top of form signal.

According to another aspect of the present invention a method of printing multiple page documents as in a print engine having associated therewith a page layout with data fields to be printed tagged with codes, and a raster image processor, is provided. The method comprises the steps of: (a) Providing a data stream including a record layout including data field codes which provide information to the print engine through the raster image processor so that it can be determined where to print strings of variable information in a document, the strings only being provided once even if printed multiple places within a document. And, (b) operating the raster image processor in real time as the data flows to the print engine.

The print engine is preferably capable of print speeds of at least about 600 or 800 feet per minute (e.g. about 1000 feet per minute), and steps (a) and (b) may be practiced to provide data at a transfer rate of at least about 73,000 characters per second (e.g. about 92,000 characters per second). Steps (a) and (b) may be practiced to provide as part of the data stream variable or fixed graphic elements printed at the same speed as the rest of the data stream, and to print in any color with up to 256 gray levels per color. The method may be practiced utilizing a registration controller which assumes all registration functions, and a plurality of raster image processors may be provided, each capable of printing in response to either the data stream or a top of form signal, and there may be the further step (c) of connecting the data stream to the registration controller through a high speed serial link so that the data stream passes through the registration controller to the raster image processors.

According to another aspect of the invention a system for printing multiple page documents is provided comprising the following components: A print engine capable of printing at speeds of at least 300 feet per minute and having associated therewith a page layout with data fields to be printed tagged with codes. A raster image processor connected to the print engine for providing at least partial print control of the print engine. Means for providing a data stream including a record layout including data field codes which provide information to the print engine through the raster image processor so that it can be determined where to print strings of variable information in a document, the strings only being provided once even if printed multiple places within a document And, means for operating the raster image processor in real time as the data flows to the print engine. A plurality of raster image processors may be provided, each capable of printing in response to either the data stream or a top of form signal; and further a registration controller may be provided which assumes all registration functions, and is connected to the raster image processors.

It is the primary object of the present invention to provide an enhanced capability method and system for generating high speed variable information printed multiple page documents. This and other objects of the invention will become clear from an inspection of the detailed description of the invention and from the appended claims.

DETAILED DESCRIPTION OF THE DRAWINGS

Figure 1:
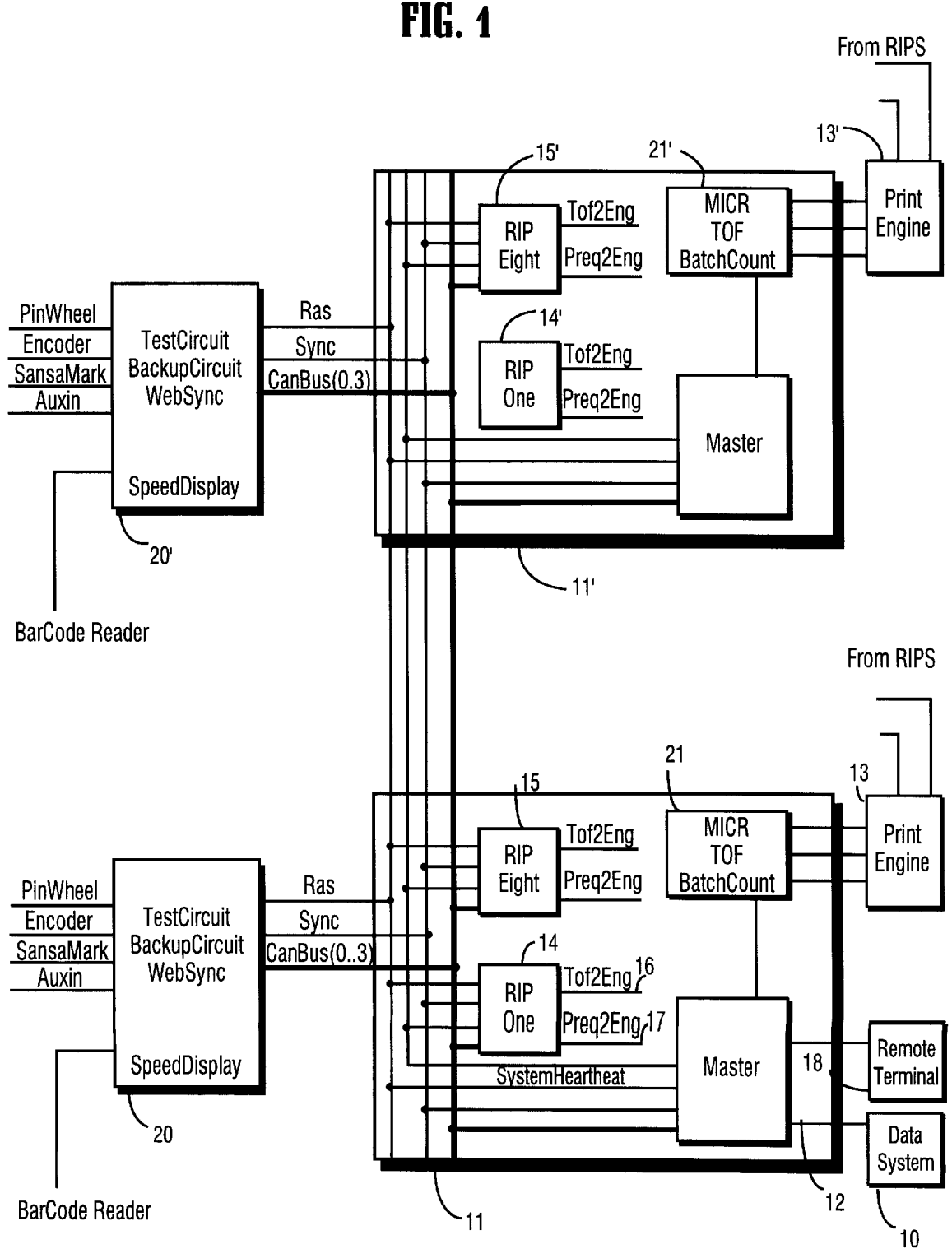
FIG. 1 is a schematic block diagram showing an exemplary system according to the present invention.

In the description of the drawings and in the following detailed discussion various nomenclature will be utilized which may be defined as follows:

RIP Raster Image Processor
TOF Top of Form
RegCon Registration Controller
Hub Network Hub (distribution point)
PDF Portable Document Format
RAMPS CD-Rom Archival Application
FDDI Fiber Distributed Data Interface
CORBA Common Object Request Broker Architecture SURF Synchronous Universal Registration Formatter
PPC PowerPC
OS Operating System
RISC Reduced Instruction Set Computer
BIG Bit Image Generator
BIMS Bit Image Memories
ECM Engine Control Module
FIM Font Image Memory
DECOMP Decompression
Screen Screening Module
HSS High Speed Storage
ENET Ether Net
Hippi High Performance Parallel Interface FIG. 1 schematically illustrates basic components of an exemplary system according to the present invention. The system includes a data system 10 and one or more registration controllers hub 11, 11'. The registration controller 11 is connected to the data system 10 through a high speed serial link 12, such as a 100 based Ethernet link or an RS232. The registration controller hubs 11, 11' provide all registration functions for printing documents, relieving conventional RIPs of that function.

The system of FIG. 1 also includes one or more print engines 13, 13', which may be any suitable high speed printers such as a MIDAX, Xeikon, or any other suitable printer, such as of electrostatic or inkjet technology types. The print engines 13, 13' typically have associated therewith (either in the casing thereof, or otherwise located in the controller or raster image processors) a page layout with data fields to be printed tagged with codes.

The system of FIG. 1 further includes one or more raster image processes 14, 15, 14', 15', per controller hub 11, 11', connected to the controller hub 11, 11', and connected to a print engine 13, 13' for controlling the print engine to print documents. The raster image processors are similar to those in the conventional XL Data System except that they have been relieved of the registration functions (assumed by the registration controller hub 11, 11') and are constructed to print not only from a TOF signal, but also in response to a data stream from the data system 10. This is indicated schematically in FIG. 1, for example, by the line 16 extending from the RIP 14 as the TOF signal provider, and line 17 which provides the data stream controls to the print engine 13.

The system of FIG. 1 also preferably includes a remote terminal 18 (such as a PC) to be provide a user interface to the registration controller(s) hub(s) 11 (, 11') and a remote operator control. The remote terminal 18 has standard control features, such as are provided for a PC, such as a keyboard, mouse, or the like. The remote terminal 18 is preferably connected to a registration controller 11 through a high speed serial link 19 such as a 100 based Ethernet link or an RS232.

The system of FIG. 1 also preferably includes one or more smart junction boxes 20, 20' connected to the registration controllers hub 11, 11' for bringing in and conditioning one or more of encoder, sensemark, bar code, or other signals, and transmitting them to the registration controller hub 11, 11'. The junction boxes 20, 20' "condition" the signals by stabilizing them and providing the proper voltage and duration pulse that can be used by the registration controller hub 11, 11' to determine when to signal the start of printing. In the exemplary embodiment illustrated in FIG. 1 the junction box 20, for example, is shown schematically connected up to a bar code reader, Auxin, a sensemark, an encoder, and a pinwheel.

For each hub 11, 11' up to eight junction boxes 20, 20' can be provided. Each hub 11, 11' is a network hub or distribution point.

The registration controller may also provide simple press functions for each print engine 13, 13', such as MICR, TOF, and batch counting, which are schematically illustrated at 21, 21' in FIG. 1 for a "kicker" control circuitry.

During normal operation, each RegCon hub will automatically keep track of multiple web form lag. To maintain form lag the RegCon constantly monitors each print engine TOF in relationship with each master heartbeat. Typically for every master heartbeat a TOF should occur. When a TOF occurs a print current form number will be sent out to the RIP. If no TOF occurs until the next system heartbeat, the print request sent to the RIP will have a −1 added to it, if two TOFs occur during the system heartbeat the second TOF will be tagged with a +1 to the form number. Once a form has been printed by the RIP (e.g. RIP 14), that RIP (14) will communicate with the data system 10 through the RegCon 11 that it indeed had printed a specific form number. This allows the data system 10 to not only request any form within that RIPs (14) data buffer to be printed, but will get a confirmation that it printed that form.

The data stream from the data system 10 includes, transmitted in parallel, a record layout. The record layout includes tags (data field codes) and the data stream itself contains only information to be printed. These two sets of information (the data stream itself and the record layout data field codes transmitted in parallel therewith) are sent to the print engine 13, 13', in parallel. When the registration controller 11 tells the print engine 13 to print a particular area of a page of a document, the print engine 13 page layout (which has the data field to be printed tagged with codes) "sees" the data field code or tag in the page layout which corresponds to the data field code or tag in the record layout, and prints the data that is designated by that tag. For example the data field code may be a code that designates a group of bytes in the data stream, for example the tag—Name— would tell the page layout in the print engine 13 that characters X to Y (e.g. 10–33) of a data record are to be printed in the data field with the "tag"—Name—. The data field codes in the data stream thus tell the system where to print strings of information (typically variable information) in the document. These strings of information need only be provided once even if they are to be printed in several places within the document. The data field codes determine where in the document the information strings will be printed, and the RIP 14, 14', 15, 15' operation is done in real time ("on the fly") as the data flows to the print engine 13, 13'.

Figure 2:
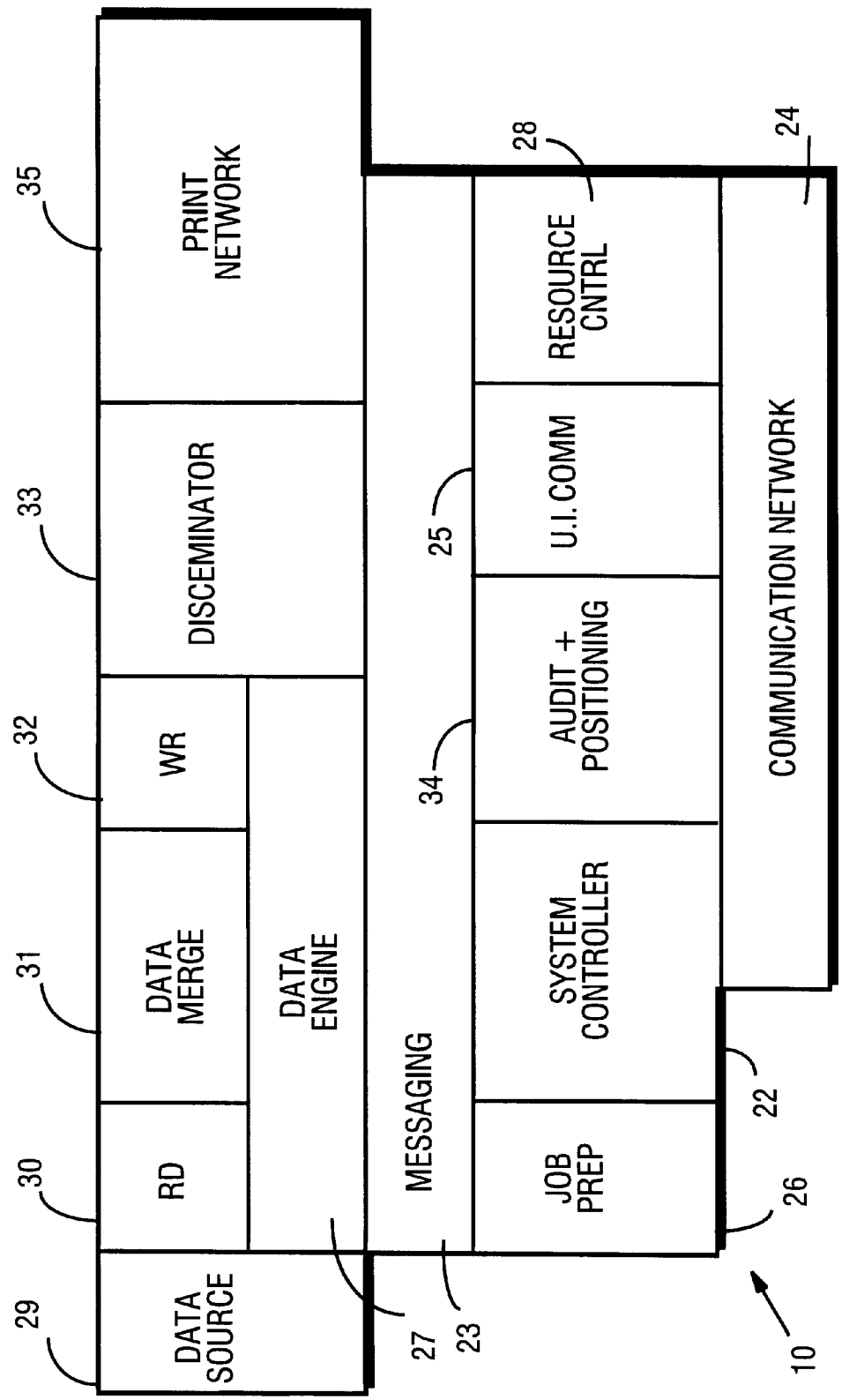
FIG. 2 is a schematic block diagram showing exemplary details of the data system of FIG. 1.

FIG. 2 schematically shows a form that the data system 10 in FIG. 1 can take. A system controller 22 may be provided for initialization and launching of the required and configurable component (e.g. as the system progresses between start-up, job loading, production, and the like modes).

A messaging sub-system 23 of the system 10 may comprise a CORBA or a comparable system which is more application specific and which transmits via a CORBA. The communication network sub-system 24 provides the print environment network which connects all of the machines together. The UI communications module 25, if provided, handles the routing of messages between the system controller and the user interfaces. Any number of control points, each expecting to communicate different types of information (such as status, messages, etc.) may be provided. The system controller would forward all "state" information to the module 25, which would be aware of all UI clients which need communications. Security rules may be applied here to filter requests for system changes from UI clients which are not authorized to perform certain functions. The user interfaces would be all portions of the system which provide control or status to human beings. All communications with "on-line" production systems will be routed through the module 25 as at that system to the system controller. If a request is not able to be serviced because of the current mode of the system it will be rejected or disabled.

The job preparation sub-system 26 of the system 10 processes job information in preparation for the production process. It informs the data engine module 27 of all set up parameters. A PDF may be a set up parameter, or a PDF stream may be read as data.

The resource controller module 28 handles all requests for resources from the job reader, data engine 27, etc. It determines if a resource is locally available or if it needs to be requested from a resource manager.

The data source module 29 may comprise a variable data manager, a transformer, stream interleaving, or the like.

The data engine 27 handles are interpretation and manipulation of data within the system. The data reader portion 30 requests input data, produces records on output, and may maintain an "input index" based on cues from the data merge portion 31 that a new document is being produced. The data merge portion 31 composes objects based on page layout, conditionals, and input records and generates PDF, Doc Set, and indexing. The Doc Writer portion 32 streams PDF pages based output behavior desired. The pages may be separated for multiple printers by all objects in an area, all objects of a particular color, all objects identified in a particular list, etc. All pages may be merged for viewing, and page ordering may be provided.

The disseminator sub-system 33 of system 10 handles the requests from the output device or devices for set up resources and production pages. It informs the document audit and positioning sub-system 34 of all activity. The document audit and positioning sub-system 34 handles the auditing of which documents have been printed, which have been reprinted, which have not yet been printed, etc. It handles requests for repositioning within the output stream, input stream, or an interruption of the current stream to enable an alternate stream (for example in process samples, "Makeready", "Autoform lag", etc.) and return to the production stream.

Finally the print network sub-system 35 of the data system 10 is a fiber channel driver and registration system.

Documents produced according to the invention are defined as a collection of pages. The construction of documents will be based on a set of page layouts which contain objects to be printed. These page layouts and objects may be conditionally imaged based on assignment of criteria attributes and documents and their objects will be resolution and coordinate system independent of the print technology.

Figure 3:
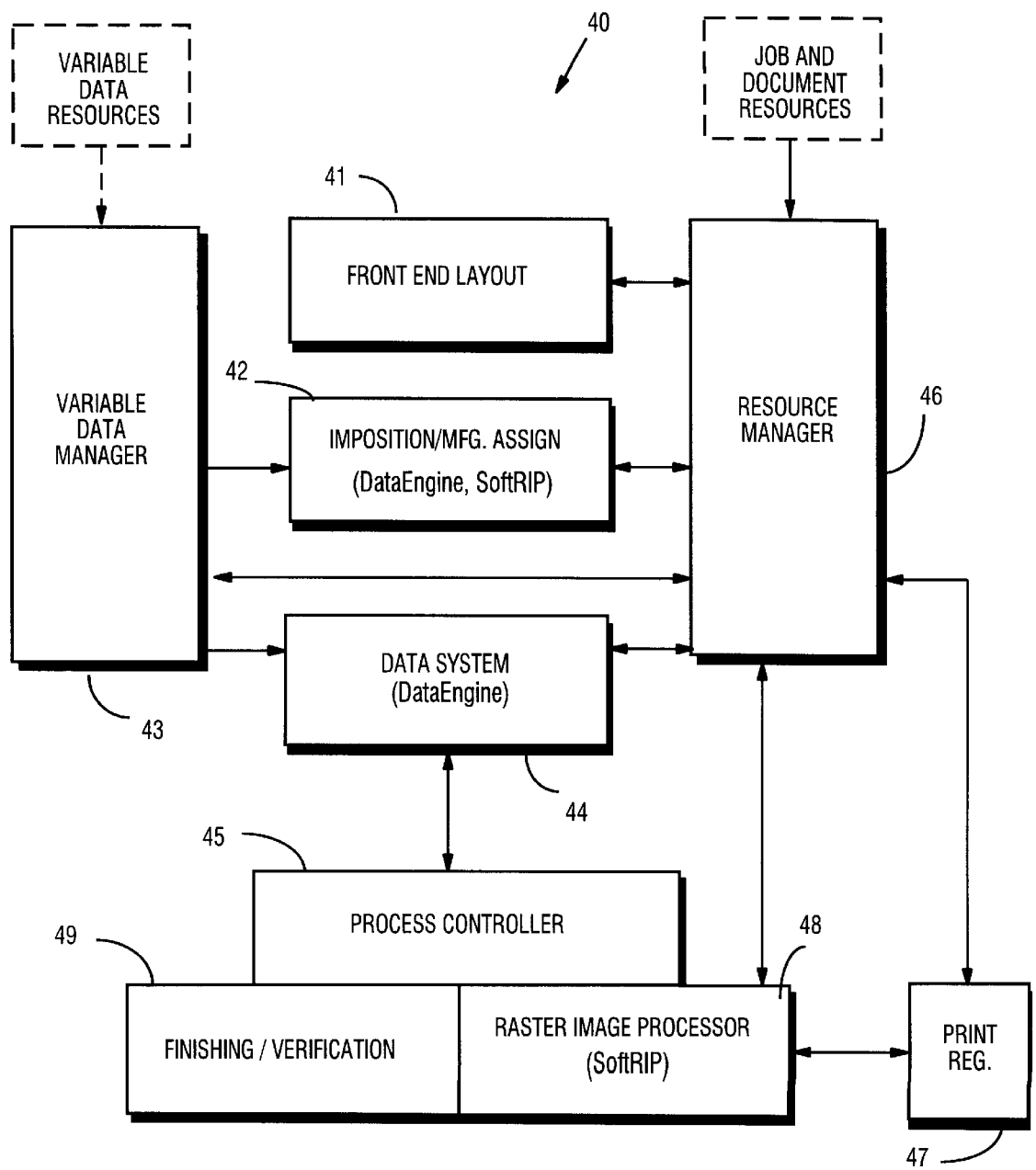
FIG. 3 is a schematic architectural overview of an exemplary system 40 according to the present invention.

FIG. 3 is a schematic architectural overview of an exemplary system 40 according to the present invention. The main building blocks of the system 10 are the front end layout 41, the imposition/manufacturing assignment (data engine, soft RIP) 42, the variable data manager 43, the data system (data engine) 44, the process controller 45, the resource manager 46, and the print registration system 47. The system in FIG. 3 is a representation of the system of FIG. 1 in an architectural format.

The front end layout 41 is a tool intended for the customer or the supplier of the system according to the invention which provides for page layout and layout proofs. The layouts are preferably based upon industry standard desk top tools with possible extensions to support specific print processors. The user will be able to 1. Place objects which will be anchored.
2. Make use of Aprint technology guides@ to assist in page composition. The guides will show the boundaries of the selected print technology so that the user can configure items to fall within the print area of, for example, ink jet heads. The user is not, however, required to use this feature.
3. Assign attributes to objects including fixed text; variable placeholder; conditional processing.
4. Group objects and assign attributes to all objects in a group;
5. Assign conditional page selection to page layouts;
6. Identify each object for reference and association.
7. Import/export resources from the Resource Manager.

When the user composes a document an object may be designated as a variable place holder. The user will simply import a list or create a list of variable tags. All variable place holders are real-time ripped.

The layout user need not be concerned with the record layout (The user will not have to define the start and stop positions for variable data fields). This relationship between variable field tag and record layout is stored in the record layout file. The layout user is only concerned with the variable place holders.

Record Layout is handled independent of the composition process. The record layout resource may be imported into, generated by, or independent of, Front End Layout. A tool will be provided to define record layouts.

Conditional processing is based on criteria definitions. The layout user is able to assign conditional attributes to pages, objects, input records, by use of named tags. The layout user will also be able to assign conditional processing as pre/post page, pre/post record, pre/post object, pre/post sheet.

The Imposition Layout & Mfg. Technology Assignment block 42 includes a number of components.

Imposition Layout (Page) is a tool intended for use after the Front End Layout 41 which provides for selection and positioning of page layouts in relation to physical sheets. These operations including n-up, duplex, rotation gutter designation. The results of this step will be known as signatures.

The following attributes are added to the job information by the Imposition function:

1. N-Up—designation of rows and columns on a signature into which sequences of pages will be placed. This includes page fill order.
2. Gutters—the gap between pages for N-Up applications.
3. Page Rotation—orientation of each page within a signature.
4. Duplex—indication whether a particular sheet will have printing on both sides
5. Crop Marks/Color Bars/Sense Marks—addition of registration and QA control marks to the signature.
6. Signature Rotation—The user will be allowed to define multiple signatures per job and control signature to signature orientation.

Imposition will be responsible for enforcing printing process constraints:

1. Top-of-form Gap

To keep print overlapping from occurring it is important that the gap from signature to signature not be smaller than 1/16 of an inch.

2. Registration Mark Clearance

In order to insure proper registration and to avoid intermittent registration shifts a ½ inch clear space is required on both sides of a sensemark.

The Mfg. Technology Assignment component is a tool intended for use after Imposition which provides for object assignment to specific print technology. Performs validation of objects on signature based on technology selected.

The following functions are performed on the job information by the Mfg. Technology Assignment step:

1. Technology Assignment—Selection of particular print technology for each object in the job. Future features could include auto-assignment based on process knowledge.

2. Validation—Each Aobject—technology@ assignment is checked to determine if the selected technology can support the object. The composite of all Aobject—technology@ assignments, across all possible signatures in a job, is also validated. This validation will include any print area size limits for the particular technology selected.

For each validation event there may be exceptions. Some exceptions can be corrected within this tool and others may require recomposition of an object in the Layout tool. Exceptions for each validation check can be corrected by:

Application of another type of technology selected from a list of suggested solutions;

Addition of another unit of the desired technology selected from a list of remaining technology;

Movement of an object, enabling a fit within the technologies already selected (performed in Layout).

Re-composition of an object, enabling a fit within technologies already selected (performed in Layout).

Assignment of Conditional attributes to Aactions@ by use of named tags. Actions include triggering of finishing controls (auxiliary devices), selective finishing processes. The user is also able to assign conditional processing as pre/post sheet.

Technology Setup Report—a report, included in the job folder, which details the set of technology required to produce a job. This would include the type of technology, ink color designations, and physical positioning of heads.

Pre-flight reconciliation of missing resources is performed on the electronic job folder on exit from these functions. The output is a complete, production ready, job definition.

The Variable Data Source/Variable Data Manager 43 acts as a >data server= and communicates with various components, like the Data System 10 for example. The Variable Data Manager 43 will:

1. Provide customer data
2. Manage Data Sets (i.e. test data, production data, make-ready data and proof data)
3. Optionally provide periodic Quality Check forms.
4. Provides for the sequencing of input from multiple sources.

Removable Media sources of data must be able to be Astreamed@ to allow for continuous printing. Based on design this may require 1 or 2 of each unit, such as SCSI Tape Drives (IBM 34×0 or 3490E cartridge Tape standard); or TD490 Cartridge Drives; or a 3490E class of drive (e.g. the TD490E); a Removable Hard Disk; a CD-ROM; and/or an Optical Floppy Disk.

1. Each system may use a LAN or WAN connection to receive data from any remote data source. This may include a remote file server=s hard disk (e.g. direct mounting via NFS) or communications channel (e.g. TCP/IP sockets, Fibre Channel).

The Data System/Data Engine 44 Data System component is a high speed print production system which utilizes a >Data Engine= to produce a standard print data stream. This component distributes the data stream to high speed printing technologies in real-time. Other responsibilities include registration; control of mechanical finishing equipment; integrated verification; audit systems. The operator may interact with the Data System via a graphical user interface, which is able to reside on multiple remote workstations. These interfaces will provide for simplified job setup, operation, and support of multiple print heads per print device.

The Data System will be responsible for:

1. Informing Process Controllers of needed resources;
2. Providing access to resources {stored at Resource Manager};
3. Distribution of resources to Process Controllers;
4. Synchronization with registration modules;
5. Logging system performance, audit, and system message data while providing access to this information. Address automatic up-loading of information to a WAN accessible location;
6. Providing for Operator Control of the print production process;
7. Providing for Operator Control of the print production setup;
8. Utilizing a high speed bus for communication to Process Controllers based on upgradable industry standards.
9. Provide features for easier form lag and registration adjustments (Automated Formlag)
10. Allow for central control of complete production system including storage and restoration of device setup parameters.
11. Support for an increased number of devices (32 maximum), over greater distances.
12. Direct connection to desktop printers for small quantities.
13. Enhance the process of repositioning after a stoppage. (This may include automatic repositioning.)
14. Support independent translation of data encoding from multiple sources. This may include various Kanji encoding as well as ASCII, EBCDIC, and Unicode.
15. Process multiple job streams simultaneously and merge output into single production process (i.e. side-by-side streams on wide print engines; merger of multiple small {color} jobs on an n-up sheet).

Press Based Job File Editing may address minor modifications such as X,Y adjustment; Font substitution, etc.

APress Setup@ Features also may be provided. Address press based configuration options which are not specific to a particular job or run include:

1. TOF signals; Error, Warning signals;
2. NodeADC setup;
3. Print Bar (nozzle) assignment;
4. device/node assignment by use of Named Parts (tagged) of the product (Front, Back, Envelope, ResponseFront, ResponseBack for example); Allow for job load time remapping without exiting, using utility, and re-loading.
5. device offset—allow changes at any UI and storage of changes made at each Process Controller;
6. device rotation; and/or
7. head/tail pull.

On-line Print Production Functions are also provided, such as:

1. Start.
2. Stop—an immediate shutdown without regard for finished product preservation.
3. Closedown—a graceful shutdown preserving product integrity.
4. Test Mode—production without data; intended for default print verification. May include additional markers (registration, print quality elements) via Criteria mechanism.
5. Makeready Mode—production with data (allowing audit; addition of Avoid markers@ over what would normally be live data via Criteria mechanism; cycling through Criteria via use of ATest Data Sets@; other advantages?).

6. Automated Form Lag—activation of assisted formlag setup which will be run while in Test or Makeready Modes (may include addition of control numbers or other tracking mechanism).

7. Data Mode—running live data intended as shippable product.

8. Record Positioning—ability to reposition based on information known about the content of input data records (i.e. input records may have fields which are not used by the output document—not available in the output stream—but which may still provide a unique identity.

9. Document Position—ability to reposition within the output stream with awareness of multiple page documents and page ordering.

10. Signature Positioning,—ability to reposition within the document stream based on which pages will end up as part of a single output sheet.

11. Select Variable Data Source(s),—ability to choose a data source independent of job or run. Ability to pause a stream, run another (for test or makeready purposes), and return to paused stream without loss of run integrity.

12. Mount

13. Single key Search Repeat.

14. Display Form.

15. TBD. and other current XL controls.

Utilities may also be provided such as:

On-line help, On-line problem reporting with automated notification/forwarding to plant technicians and product support department.

System Maintenance (administration, resource cache flushing) available as on-machine and remote access (WAN, telecom) interfaces.

BIM View Display—either SoftRIP output or direct feedback from hardware RIPs for purposes of diagnostics, or current page view.

On-line system diagnostics

The Data Engine 44 is a shared software component which combines variable data, page layout, and form imposition information into a standard data stream. This software component is shared between the print production data system, imposition proofer, imposition viewer, lost forms recovery, and RAMPS. Several input resources are used by this component and are supplied by the Resource Manager and Variable Data Manager 43. The output from this component will be routed by different output drivers based on the utilizing application.

The Variable Data Manager 43 will provide the Data Engine 44 with access to multiple data sources. The Data Engine 44 will collect objects, apply transforms, and sequence the objects for proper document construction.

The Data Engine 44 will be responsible for:

1. Performing real-time data processing including reordering of pages; pull lists; case conversion; data decryption, e.g. for existing customer applications such as U.S. Courts; AFP for Enel.

2. Having the ability to add programmable transforms e.g. converting human readable strings of digits to Interleaved 2 of 5 bar codes.

3. Have the ability to generate direct output to CD-ROM by integrating with the SoftRIP in an implementation similar to the current RAMPS system.

The Process Controller 45 interfaces the data system=s (10) output data stream with both new and existing technologies of imaging and production control. All process controllers preferably use a common format to interface with the Data System=s data bus. Where necessary a process controller may have an operator input device to supply setup information. Communication with the process controllers 45 will support real-time event processing. Process controllers 45 must be able to affect system behavior in real-time. A process controller consists of two main categories: Raster Image Processors 48 and Finishing/Verification Processors 49.

The RIP 48 accepts format information, image resources, and a standard data stream. They use these resources to generates a display list, or bit image, of the form for printing. Each RIP 48 comprises a collection of processing modules called a SoftRIP. These modules are used both collectively or in conjunction with hardware assistance modules; this allows common modules to be used both in the process controllers as well as in the proofing and data system components. This commonality provides both WYSIWYG viewing/proofing and easier system-wide software maintenance. All imaging functions to be performed by a RIP will be implemented in the SoftRIP. Any functions which require increased performance will be candidates for hardware assistance. RIP functionality will include:

1. Upon encountering any exception to normal processing the RIP will provide for both print and notification options. Print options include >print= and >skip=; notification options include >warning= and >fatal error=. For any combination of handling options the RIP will take statistics (including an object identifier) for each exception and forward to the performance log.

2. The RIP facilitates rapid switching from job to job.

3. BIMView—The resulting bit image may be routed back to the data system, or other networked system, for purposes of testing and possibly proofing.

4. All RIPS contain Stand-alone Diagnostics

5. Decompression of in-line images and compression of BIMView output.

6. RIPs will be transparent to the originating application. i.e. support of industry standard rendering metrics typical of Postscript and PDF.

The following RIP/printer combinations are readily utilized: GRIP/Midax; GRIP-SD/MICA; GRIP/Scitex; CRIP/Indigo; CRIP/Xeikon; and GRIP/Bull.

Finishing/Verification Processors 49 will provide all functionality of the current NodeADC and MADD-ADC of conventional XL Data Systems. Verification processors, based on currently implemented IPH interfaces, link the data system to capabilities of magnetic and visual verification systems.

The Resource Manager 46 organizes, maintains, and provides access to, all resources (excluding production data) needed to run a particular job. The Resource Manager will provide services for other components in the system. Maintenance of resources will be controlled either by requests from other components or via GUI tools developed to support the following functionality:

1. Tracking of resources by Vendor, Customer, Job, Run;

2. Maintaining Aequivalence@ tables for all types of resources.

E.g. Aswiss bold 12 pt@==sw212f.xlf (Moore)==xxxxx (AFP)==yyyyy (XEROX)==zzzzz (Outline).

The RM 46 has the ability to control the >level of equivalence= by assigning overrides to more general system groupings by adding to the customer or job grouping.

3. Hosting conversion of resources among various print technologies;

4. Allow for reports of all the resources including searching for a resource and supported formats for conversion;

5. Providing for job folder integrity—making sure all resources are available before going to production;

6. Qualifying—verify the completeness of resources;

7. Flagging conflicting resource assignments within a grouping and providing means to resolve these conflicts;

8. Provide for revisioning of all resources based on standard revision control methods. This includes tracking the origin of resources and derivations of a resource;

9. Provide for access control to secure resources. e.g. signatures, ldf;

10. Identify resources as resolution and coordinate system—dependent or independent. In cases of resolution and coordinate system dependencies, provide the resolution and coordinate system.

11. Make the resources highly available for the other components of the system and to other systems requiring the same resources.

12. Maintain links to external resources. e.g. images in customer database;

13. Maintain links to customer and contact information;

14. Provide for backup, archiving, and restoration of resources;

15. Provide for addition, deactivation, and removal of resource

The Print Registration System 47 accounts for:

1. Sheet size and sheet count independence;

2. Internal integrity verification;

3. Synchronization of all Process Controllers;

4. Allows for dynamic entry of sheets (e.g. envelope feeder with inkjet print)

5. Maintaining formlag synchronization and integrity automatically.

6. Allows form size independent adjustment of registration (circumferential registration).

7. Integral part of the "Automated Form Lag" mode of operation.

The following registration input capabilities may be employed:

1. Sensemark
2. Encoder driven (Tight web)
3. Pinwheel
4. Direct Trigger

Figure 4:
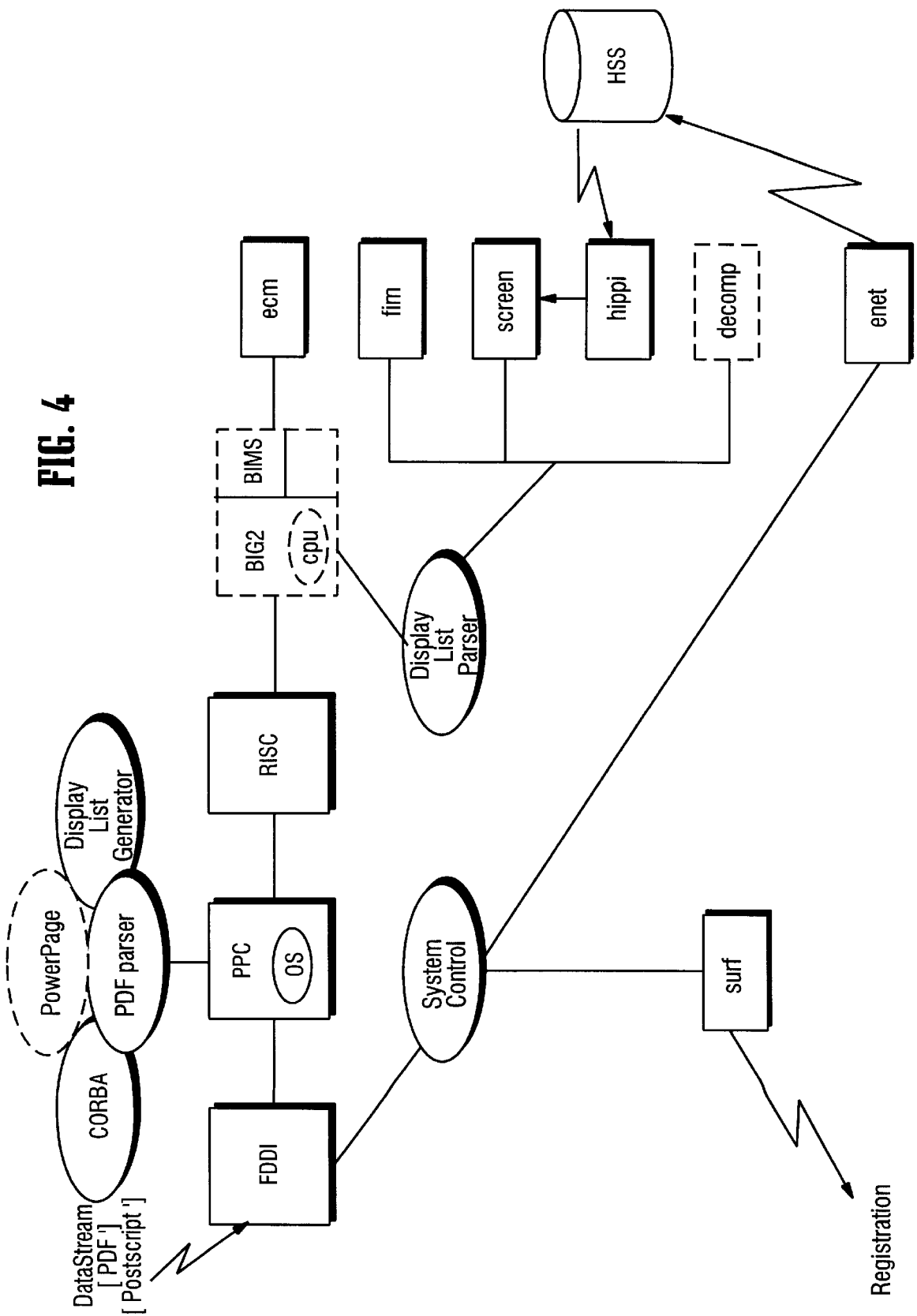
FIGS. 4 through 6 are schematic block diagrams illustrating the interconnection of various components according to the system of the present invention for accomplishing particular functions, in alternative embodiments.
Figure 5:
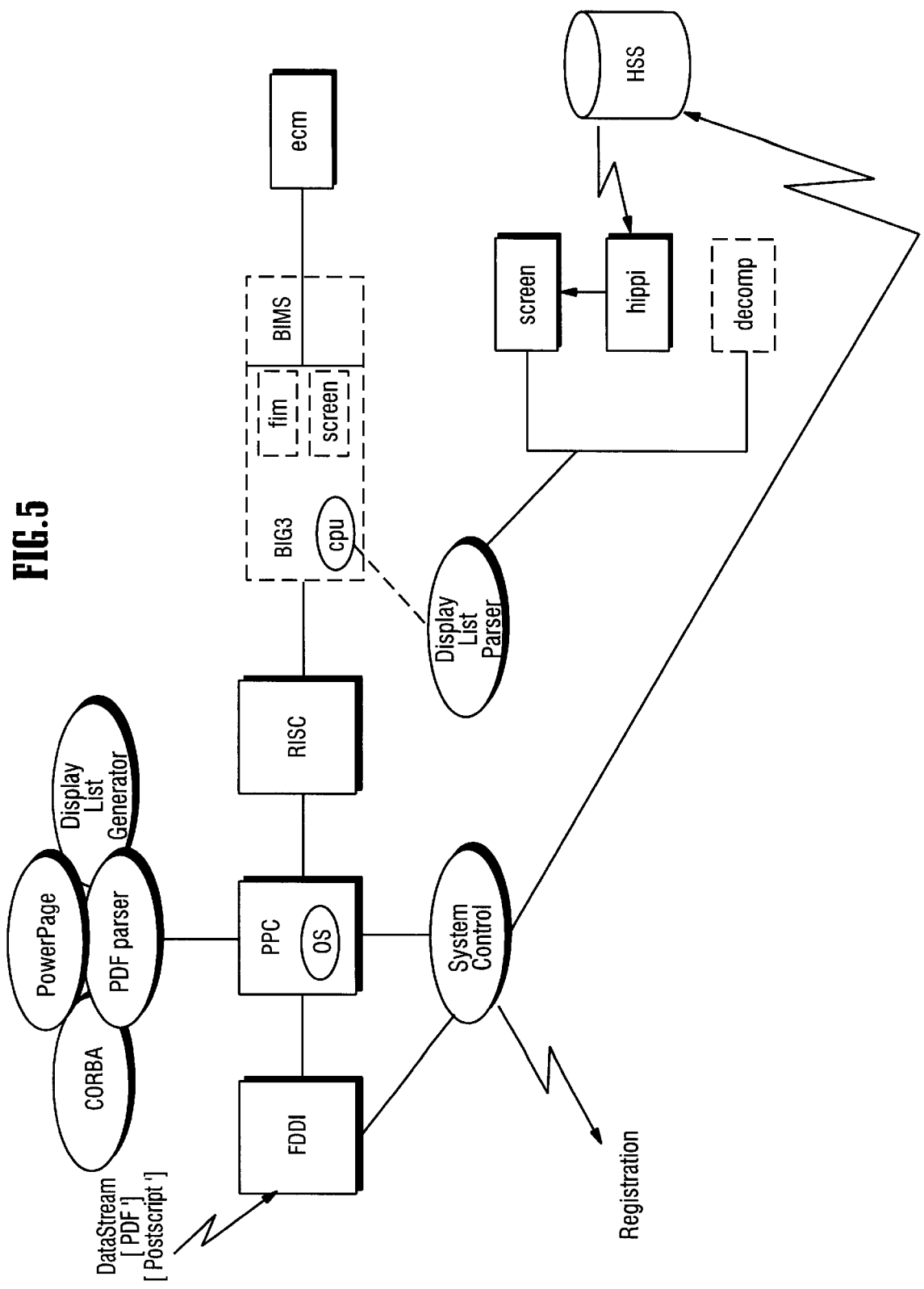
Figure 6:
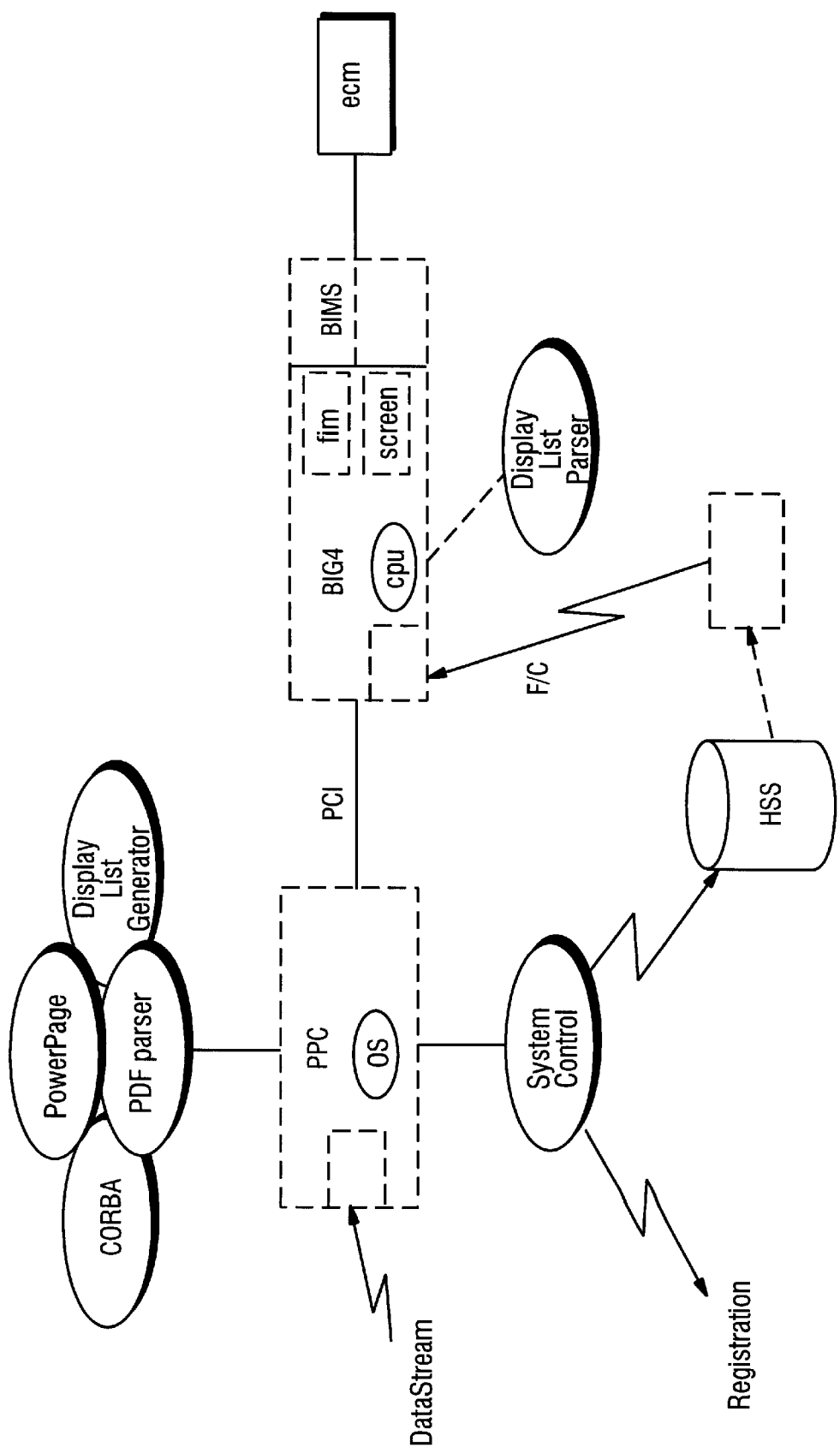

FIGS. 4 through 6 illustrate various optional configurations that components defined in the above definitions table may utilize. It should be understood that these are only representative, however, of configurations and components that may be provided, and other configurations or components to provide the advantages according to the present invention also may be provided. For example in simpler system versions of the FIG. 4 embodiment the Display List Parser may be connected to a BIG instead of BIG2, and/or the "screen", "HSS", "hippi" and/or "enet" components/functions need not be provided.

In any of the systems or components of FIGS. 1 through 6 the data streams may include various elements. Exemplary elements that may be provided, and attributes that they may have, are as follows:

Image: IMG

The IMG element indicates a variable image placeholder. Attributes of the IMG element are:

Name name for the variable field corresponding to this element.

Optional attributes are:

ALT test image to use in place of the referenced image resource, for example, for a non-data mode viewing.

ALIGN alignment of the image with respect to the text baseline, vertical placement. See option attribute PLACE for horizontal placement.

"TOP" specifies that the top of the image aligns with the tallest item on the line containing the image.

"MIDDLE" specifies that the center of the image aligns with the baseline of the line containing the image.

"BOTTOM" specifies that the bottom of the image aligns with the baseline of the line containing the image.

"HOTSPOT" specifies that the image's hot spot aligns with the baseline of the line containing the image. An image without a specified hot spot defaults to the center.

PLACE alignment of the image with respect to the text characters placement, inline, direction, horizontal placement. See optional attribute ALIGN for vertical placement.

"LEFT" specifies that the image's left side aligns with the character inline position.

"MIDDLE" specifies that the center of the image aligns with the character inline position.

"RIGHT" specifies that the image's right side aligns with the character inline position.

"HOTSPOT" specifies that the image's hot spot aligns with the character inline position. An image without a specified hot spot defaults to the center.

Examples of Use:

<IMG NAME=agent ALT="jones.tif">

VARIABLE: VAR

The VAR element indicates a variable field placeholder. Text entered between the start-tag <VAR> and end-tag </VAR> is test text. This text is used for viewing and printing the variable field without a data set.

Optional attributes are:

FILL specifies test to fill the variable field when viewing and printing without a data set. Filling starts from the test text to MAXLENGTH. The first character specified is repeated to fill the field.

For example: <VAR MAXLENGTH=20 FILL="xZ">FullNamexxxxxxxxxxxxZ".

NAME name for the variable field corresponding to this element. If not specified the first word after start-tag<VAR> will be used.

MAXLENGTH constrains the number of characters that can be printed.

Abbreviation for VAR:

<<FullName>> implies <VAR>FullName</VAR>

Example of use:

<VAR MAXLENGTH=20 FILL="xZ">FullName</VAR> your current balance is <VAR NAME=balanceFILL=$9,999.99"></VAR>. Your average balance for <VAR>Month</VAR> was <<Average Balance>>.

Test view:

FullNamexxxxxxxxxxxxZ your current balance is $9,999.99. Your average balance for Month was AverageBalance.

FILLED COLUMN: FC

The FC element indicates a filled column follows. All test up to the end filled column marker, </FC> will be considered part of the filled column.

Optional attributes are:

PLACE specifies the placement option to use while rendering he text with respect to its bounding box. Options include UPL, UPC, UPR, ML, MC, MR, LL, LC, LR, BL, BC, BR to indicate vertical positioning of upper, middle, lower, or baseline, and horizontal positioning of left, center, or right.

PARAGRAPH: P

The P element indicates a paragraph follows. All text up to the end paragraph marker, </P> will be considered part of the paragraph. Paragraphs can be contained within a filled column.

Optional attributes are:

JUST specifies the justification option to use while rendering the text with respect to its bounding box.

Options include LEFT, CENTER, RIGHT, and FULL.

CONDITION: CG

The CG element indicates that conditional items follow. All items up to the end condition marker, </CG> will be considered part of the conditionally based print items.

Attributes of the CG element:

Name name tag for the condition. If not specified, the first word after start-tag CG will be used.

Example of use:

<CG>NAME=NEAGENT<IMG>SRC=agent ALT="jones.tif"</IMG></CG>

While speeds of at least 600 feet per minute, and typically over 800 feet per minute, and up to about 1000 feet per minute, can be provided for printing utilizing the system and method of the invention, for different types of jobs the actual processing time may require slower run speeds, or more powerful hardware assistance, to render and print a document. Any suitable standards of quality and tolerances may be utilized, such as Seybold type test suits to ensure proper conformance to quality and product reliability. Data integrity may be provided by internal validation/message protocol, such as utilizing standard Moore Business Forms data integrity checks such as record/CheckSum. For some situations encryption and decryption algorithms may be provided. Make-Ready time may be addressed throughout the system, minimizing the set up and processing time at each stage of the work flow, using accepted industry standards. Also self-test diagnostics may be utilized on power-up, and component stand-alone ono system wide diagnostics may also be utilized.

While the invention has been herein shown and described in what is presently conceived to be the most practical and preferred embodiment thereof it will be apparent to those of ordinary skill in the art that many modifications may be made thereof within the scope of the invention, which scope should be accorded the broadest interpretation of the appended claims so as to encompass all equivalent systems and methods.

What is claimed is:

1. A system for generating high speed variable information printed multiple page documents, comprising:

a data system for providing a data stream;

a registration controller connected to the data system through a high speed serial link, said registration controller providing all registration functions for printing documents;

a print engine;

a raster image processor connected to said registration controller, and connected to said print engine for controlling said print engine to print documents;

a remote terminal connected to said registration controller to provide a user interface to said registration controller and a remote operator control; and a smart junction box connected to said registration controller for bringing in and conditioning one or more of encoder, sensemark, barcode, or other signals and transmitting them to said registration controller.

2. A system as recited in claim 1 wherein said data system has the capability to manipulate and transfer data in said data stream at at least eight Mbytes per second.

3. A system as recited in claim 2 wherein said data stream includes, transmitted in parallel, a record layout including data field codes and wherein said print engine has associated therewith a page layout with data fields to be printed tagged with codes; so that the data field codes tell said data system, said raster image processor and/or said print engine system where to print strings of information in a document, said strings only being provided once even if printed multiple places within a document, data flowing in said data stream to said print engine as said raster image processor functions in real time.

4. A system as recited in claim 1 wherein said system has a transfer rate of about 92,000 characters per second to provide an actual print speed of said print engine at about 1000 feet per minute.

5. A system as recited in claim 4 further comprising a plurality of said registration controllers and connected print engines and smart junction boxes, each of said print engines having an actual print speed of about 1000 feet per minute.

6. A system as recited in claim 1 wherein said system has a transfer rate of about 360,000 characters per second to provide an actual print speed of said print engine at about 300 feet per minute.

7. A system as recited in claim 1 wherein a plurality of raster image processors are provided connected to said registration controller, each raster image processor capable of printing in response to either the data stream or a top of form signal.

8. A system as recited in claim 1 wherein said data stream includes a record layout including data field codes; and wherein said print engine has associated therewith a page layout with data fields to be printed tagged with codes; so that the data field codes tell said data system, said raster image processor, and/or said print engine system where to print strings of variable information in a document, said strings only being provided once even if printed multiple places within a document, data flowing in said data stream to said print engine as said raster image processor functions in real time, so that an entire multiple page document is printed at once rather than.

9. A method of printing multiple page documents using a print engine having associated therewith a page layout with data fields to be printed tagged with codes, a registration controller which assumes all registration functions, and a plurality of raster image processors each capable of printing in response to either the data stream or a top of form signal, said method comprising the steps of:

(a) providing a data stream including a record layout including data field codes which provide information to the print engine through the raster image processor so that it can be determined where to print strings of variable information in a document, the strings only being provided once even if printed multiple places within a document;

(b) operating the raster image processor in real time as the data flows to the print engine; and (c) of connecting the data stream to the registration controller through a high speed serial link so that the data stream passes through the registration controller to the raster image processors.

10. A method as recited in claim 9 wherein the print engine is capable of print speeds of at least about 800 feet per minute, and wherein steps (a) and (b) are practiced to provide data at a transfer rate of at least about 73,000 characters per second.

11. A method as recited in claim 10 wherein steps (a) and (b) are practiced to provide as part of the data stream variable or fixed graphic elements printed at the same speed as the rest of the data stream data.

12. A method as recited in claim 11 wherein steps (a) and (b) are practiced to print in any color with up to 256 gray levels per color.

13. A method as recited in claim 9 wherein the print engine is capable of print speeds of about 1000 feet per minute, and wherein steps (a) and (b) are practiced to provide data at a transfer rate of about 92,000 characters per second.

14. A method as recited in claim 9 wherein up to six controllers are provided, and wherein steps (a) and (b) are practiced to provide data at a transfer rate of about 92,000 characters per second to each of the up to six controllers.

15. A method as recited in claim 9 wherein up to six controllers are provided, and wherein steps (a) and (b) are practiced to provide data at a transfer rate of about 360,000 characters per second to each of the up to six controllers.

16. A method of printing multiple page documents using a print engine having associated therewith a page layout with data fields to be printed tagged with codes, a registration controller which assumes all registration functions, and a plurality of raster image processors, each capable of printing in response to either the data stream or a top of form signal, said method comprising the steps of:

(a) providing a data stream including a record layout including data field codes which provide information to the print engine through the raster image processors so that it can be determined where to print strings of variable information in a document, the strings only being provided once even if printed multiple places within a document;

(b) operating the raster image processor in real time as the data flows to the print engine; and (c) connecting the data stream to the registration controller through a high speed serial link so that the data stream passes through the registration controller to the raster image processors.

17. A method as recited in claim 16 wherein steps (a) and (b) are practiced to provide as part of the data stream variable or fixed graphic elements printed at the same speed as the rest of the data stream data.

18. A method as recited in claim 16 wherein steps (a) and (b) are practiced to print in any color with up to 256 gray levels per color.

19. A method as recited in claim 9 wherein the print engine is capable of print speeds of at least about 300 feet per minute, and wherein steps (a) and (b) are practiced to provide data at a transfer rate of about 360,000 characters per second for a print speed of about 300 feet per minute.

\* \* \* \* \*